Feb. 7, 1939.  W. KNIPPELMEIR  2,146,019
ANIMAL TRAP
Filed Nov. 16, 1937

INVENTOR
WILLIAM KNIPPELMEIR
By Adam E. Fisher
ATTORNEY

Patented Feb. 7, 1939

2,146,019

UNITED STATES PATENT OFFICE 2,146,019

ANIMAL TRAP

William Knippelmeir, Minco, Okla.

Application November 16, 1937, Serial No. 174,745

2 Claims. (Cl. 43—87)

This invention relates to improvements in animal traps and more particularly to an improvement in the trap shown in my prior Patent No. 1,865,920 of July 5, 1932.

The main object of the invention is to provide, in a simple and inexpensive form, a trap in which the actual trapping or holding elements are in the form of snare loops which are associated with an animal released tripping mechanism in such manner that when the animal releases the trip the snares will draw tight about the throat of the animal and kill it instantly and in a relatively painless manner.

A further object is to provide a trap of this kind embodying a pair of snare loops which are trained at their ends through a brace yoke and connected to a lever element which is spring set by a torsional coil spring in such manner as to normally move away from the brace yoke and thereby draw the loops of the snares tight against the yoke, there being a trip pan and latch lever so arranged that the lever element may be held adjacent to the brace yoke until the animal depresses the trip pan. When the animal thus releases the lever element one or the other of the snare loops is in position to engage the animal by the neck and so catch and kill the animal.

These and other more specific objects of the invention will be made apparent in the course of the following detailed specification, reference being had to the accompanying drawing wherein Figure 1 is a perspective view of the trap in set position.

Figure 1:
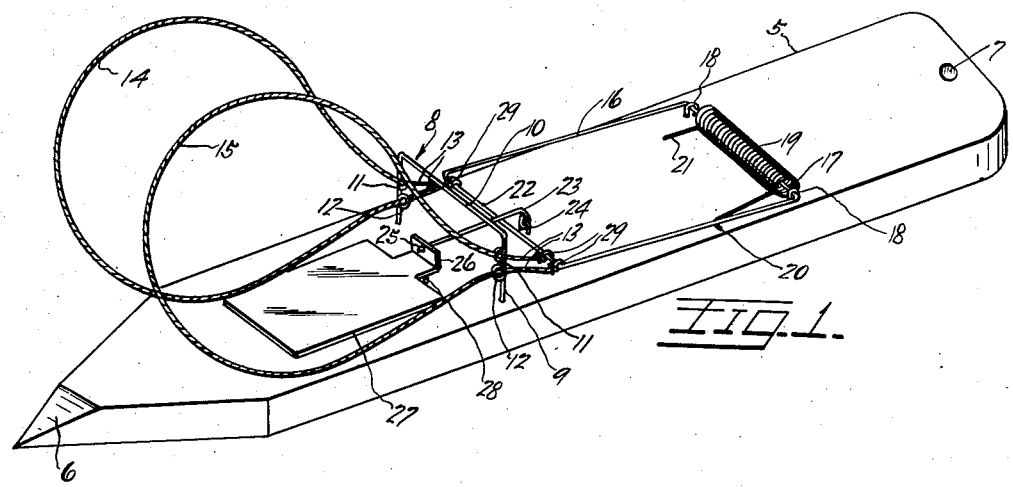
Figure 3:
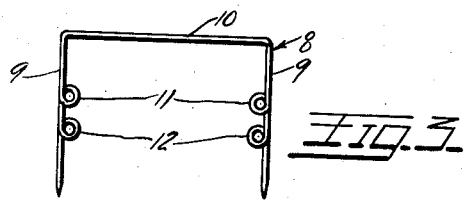
Figure 3 is an elevation of the brace yoke alone.

Referring now with more particularity to the drawing, the reference character 5 indicates the elongated base for the trap and which is made of any suitable material. Preferably one end, hereinafter termed the frontal end, of this base is pointed as at 6, so that it may be thrust into the ground if necessary to hold the trap in an animal runway or den opening while the rear end has an aperture 7 to receive an anchor chain (not shown) if such is used.

Mounted at a medial position on the base 5 is an inverted U-shaped brace yoke 8 formed of heavy wire or rod with its legs 9 suitably anchored in the base and its bight 10 extended transversely above the base. The legs 9 are each formed into, or provided with, a pair of spaced eyes 11 and 12 through which the ends 13 of a pair of snare loops 14 and 15 are slidably and rearwardly passed. These snares are made of wire, chain or cord which will have sufficient flexibility to pull easily through the eyes 11 and 12 but which will permit the loops to stand out opening as shown in Figure 1 at the frontal portion of the base.

An actuating lever 16 of rectangular form and made of wire is pivotally mounted by one end 17 in staples 18 secured to the base 5 adjacent to the rear end thereof and a torsional coil spring 19 is placed over this end of the lever with one extremity of the spring engaging one side of the lever as at 20, while the other 21 bears against the base. The arrangement thus is such that the free end 22 of the lever 16 normally swings over to the rear of the base as shown in Figure 2.

A latch or latch lever 23 is pivotally mounted on the base by a staple 24 located just rearwardly of the brace yoke 8 and the free end of this latch is adapted to extend forwardly over the free end of the lever 16 when that lever is swung forwardly to "set" position (Figure 1). The latch then engages in an aperture 25 formed in the end 26 of the trip pan or pedal 27 which is hinged at 28 to the base and when raised moves this end 26 back into engagement with the latch. This holds the latch and lever in their set positions. The ends 13 of the snares are attached as at 29 to the free end of the lever 16.

In operation the trap is set as described and as shown in Figure 1. The forward movement of the lever 16 thus frees the snare loops so that they may be extended as shown and now as an animal enters from either direction into either of the loops, it will depress the trip pedal 27 causing the same to swing downwardly and free the latch 23. This action releases the lever 16 allowing the spring 19 to throw the lever rearwardly exerting a pull on the snare loops to draw them tight about the animal's throat. This of course kills the animal quickly and relatively painlessly.

Figure 2:
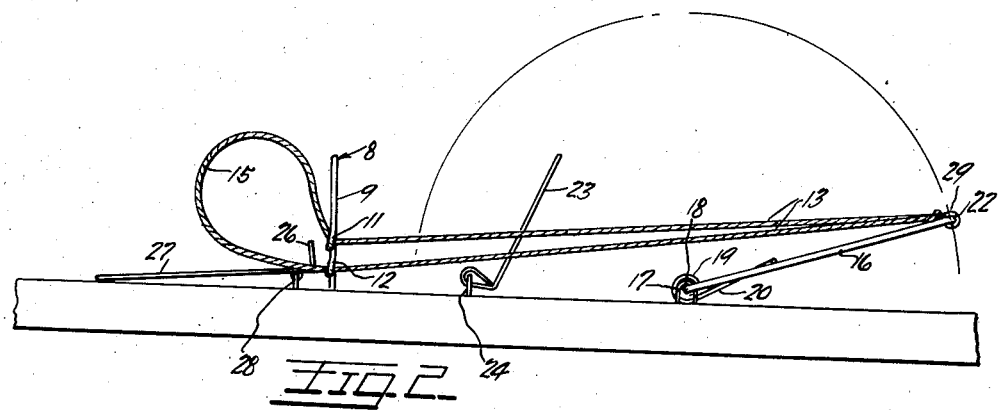
Figure 2 is a fragmental side elevation of the trap in "sprung" position.

The pressure or pull of the snare loops is exerted against the brace yoke 8 and the traps are intended to be made in various sizes according to the kind of animals to be caught so that in "sprung" position the lever 16 will lie nearly flat against the base 5 (Figure 2). This aids in holding the animal since the pull or jerks exerted on the snares by the trapped animal will act with very little leverage on the lever 16. This is clearly shown in Figure 2. Of course the snares may also be adjusted to any suitable length required and it will also be evident that one end of each snare might be tied rigidly to the yoke 8 if less contraction of the snare loops is desired.

The trap herein disclosed has a number of advantages over that shown in my prior patent hereinbefore referred to. These are, mainly, in the ease whereby the trap may be set, the use of double snare loops to properly engage an animal entering from either side and the compactness of the trap.

It is to be understood that changes may be made in the structure shown and described, so long as such changes fall within the spirit and scope of the appended claims.

Having thus fully described my invention, what I claim as new and desire to secure by Letters Patent is:

1. In a trap, a base, an inverted U-shaped brace yoke mounted on the base and having spaced eyes in its legs, a snare loop passed slidably at its ends through the eyes of each leg of the yoke, a lever pivotally mounted on the base and connected to the ends of the snare loops, spring means for normally urging the lever away from the yoke to draw the snare ends through the said eyes, a trip pan hinged on the base between the snare loops, and a latch adapted to engage the said lever and trip pedal to releasably hold the lever adjacent to the yoke and thereby allow the snare loops to stand open at each side of the trip pedal.

2. In a device of the kind described and including an elongated base, a trip pan hinged on the base, a spring set lever mounted on the base and having its free end movable towards the trip pan, a latch pivotally secured at one end to the base and adapted to be passed over the spring set lever and be releasably retained by the trip pan, a yoke mounted transversely of the base adjacent the inner end of the trip pan and spring set lever when depressed on the base, each leg of the yoke being provided with a pair of eyes, and a snare loop passed slidably through the pair of eyes on each leg of the yoke, the ends of the loops being connected to the said spring set lever.

WILLIAM KNIPPELMEIR.